United States Patent

Gennesseaux

[11] Patent Number: 5,961,104
[45] Date of Patent: Oct. 5, 1999

[54] ELECTROMAGNETIC ACTUATOR, AND A HYDRAULIC ANTIVIBRATION SUPPORT INCLUDING SUCH AN ACTUATOR

[75] Inventor: André Gennesseaux, Conie-Molitard, France

[73] Assignee: Hutchinson, Paris, France

[21] Appl. No.: 09/119,276

[22] Filed: Jul. 20, 1998

[30] Foreign Application Priority Data

Jul. 23, 1997 [FR] France ............................ 97 09365

[51] Int. Cl.[6] ............................................ F16F 5/00
[52] U.S. Cl. ............................ 267/140.14; 267/140.15
[58] Field of Search .................................. 310/68 R, 51,
310/67 R, 68 B, 68 E; 267/140.14, 140.15,
219, 140.13; 188/267, 269, 298; 318/687,
653; 248/562

[56] References Cited

U.S. PATENT DOCUMENTS

| | | | |
|---|---|---|---|
| 4,650,170 | 3/1987 | Fukushima | 267/140.1 |
| 4,757,222 | 7/1988 | Shiraki et al. | 310/68 B |
| 4,975,607 | 12/1990 | Hara et al. | 310/67 R |
| 5,006,744 | 4/1991 | Archer et al. | 310/89 |
| 5,297,781 | 3/1994 | Gennesseaux | 267/140.14 |
| 5,621,293 | 4/1997 | Gennesseaux | 318/687 |
| 5,810,336 | 9/1998 | Gennesseaux | 267/140.14 |

FOREIGN PATENT DOCUMENTS

| | | | |
|---|---|---|---|
| 0 544 576 | 6/1993 | European Pat. Off. | H02P 7/00 |
| 0 561 703 | 9/1993 | European Pat. Off. | F16F 13/00 |
| 59-149010 | 8/1984 | Japan | H01F 7/16 |

OTHER PUBLICATIONS

French Preliminary Search Report dated Mar. 20, 1998, French Application FR 9709365 filed Jul. 23, 1997.

*Primary Examiner*—Nestor Ramirez
*Assistant Examiner*—Dang Dinh Le
*Attorney, Agent, or Firm*—Marshall, O'Toole, Gerstein, Murray & Borun

[57] ABSTRACT

An electromagnetic actuator has two electromagnets controlled by an electronic circuit and controlling a ferromagnetic slab, the slab co-operating with two electrodes connected to the electronic circuit to form a capacitive sensor. The two electrodes and the electronic circuit are carried by two printed circuit boards secured to the electromagnets.

8 Claims, 1 Drawing Sheet

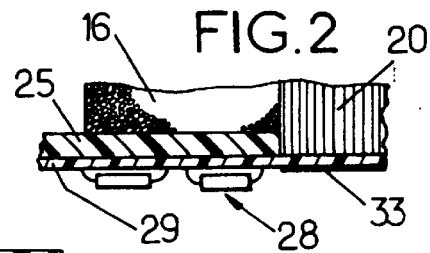
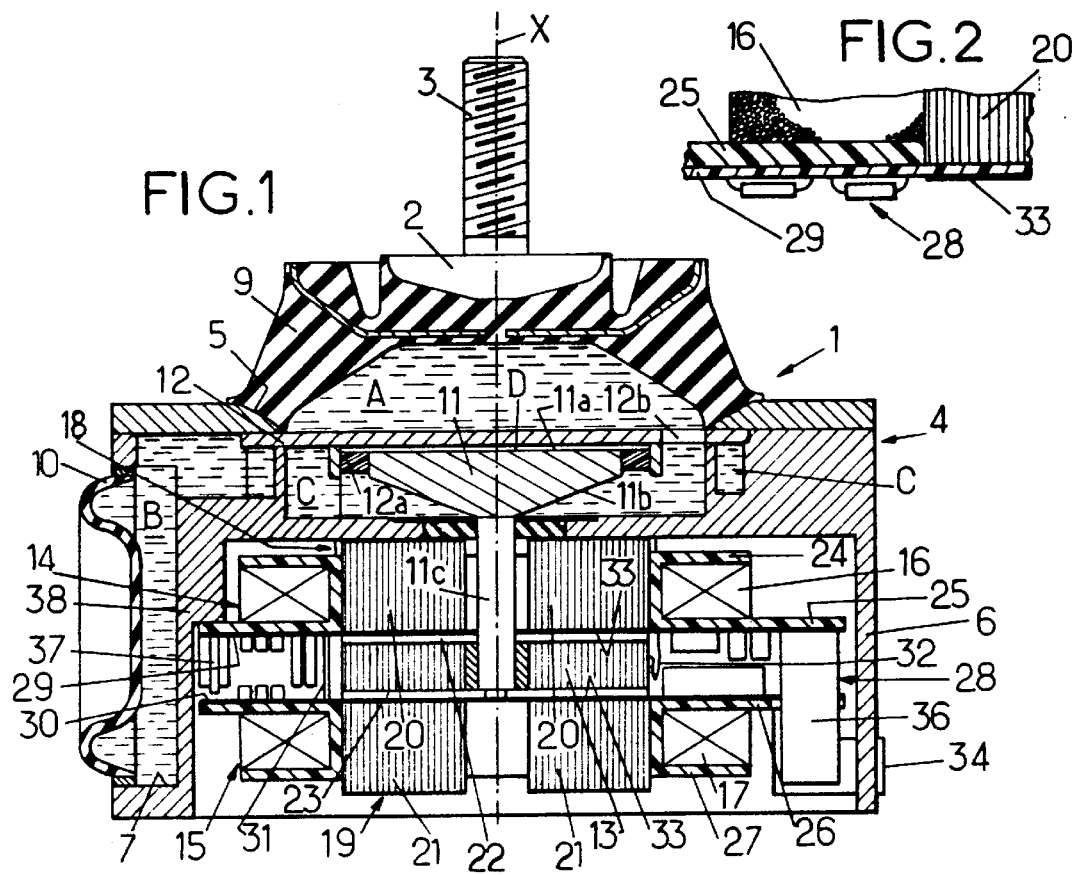
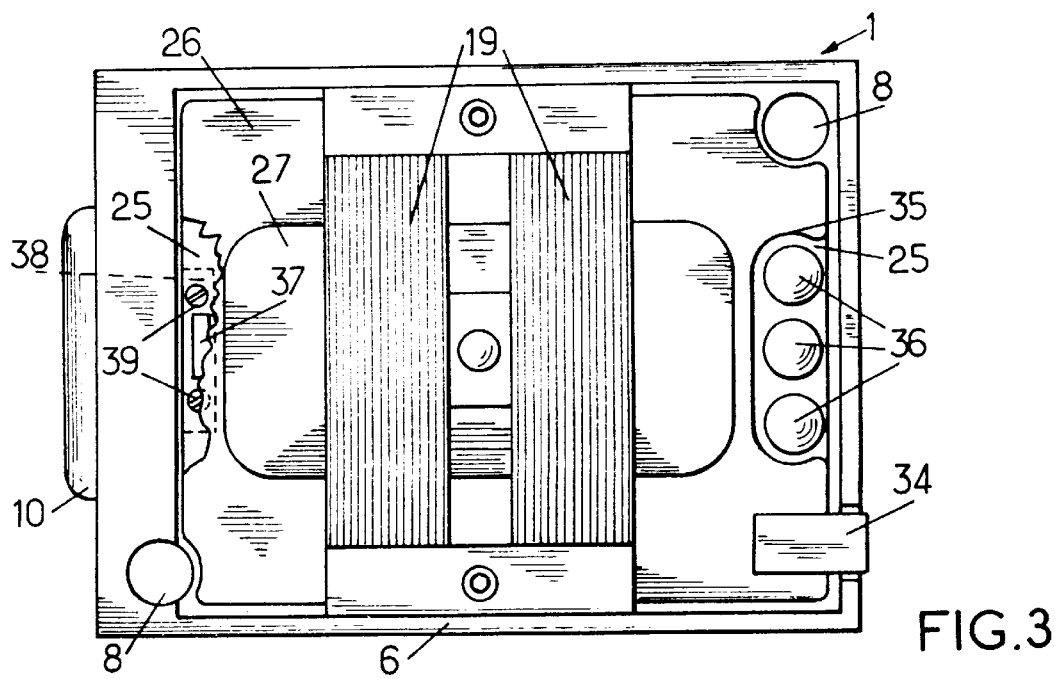

ELECTROMAGNETIC ACTUATOR, AND A HYDRAULIC ANTIVIBRATION SUPPORT INCLUDING SUCH AN ACTUATOR

FIELD OF THE INVENTION

The present invention relates to electromagnetic actuators, and to hydraulic antivibration supports including such actuators.

More particularly, the invention relates to an electromagnetic actuator, comprising:

at least a first electromagnet comprising a first electrical coil associated with a first metal yoke;

a moving magnetic element movable under drive from the first electromagnet;

at least a first electrode carried by a first printed circuit board secured to the first electromagnet, said first electrode being disposed facing the moving magnetic element to co-operate therewith to constitute a capacitive sensor detecting the displacement of said moving magnetic element; and an electronic control circuit electrically connected firstly to the first electrode and to the moving magnetic element to measure the displacement of said moving magnetic element, and secondly to the first coil to control the first electromagnet to impart vibratory motion to the moving magnetic element as a function of the measured displacement of said moving magnetic element.

BACKGROUND OF THE INVENTION

Document EP-A-0 544 576 describes an example of such an actuator.

The actuator described in that document gives entire satisfaction, but is nevertheless rather bulky, particularly because of the presence of its electronic control circuit which is distinct from the first printed circuit board.

Such bulk can be troublesome, particularly when the actuator is to be used in an environment where there is little room available, for example in a hydraulic anti-vibration support of the kind described in document EP-A-0 561 703.

OBJECTS AND SUMMARY OF THE INVENTION

A particular object of the present invention is to mitigate that drawback.

To this end, according to the invention, in an electromagnetic actuator of the kind in question the electronic control circuit is carried at least in part by said first printed circuit board.

By means of these dispositions, advantage is taken of the presence of the first printed circuit board to house on said board at least a portion of the electronic control circuit, thereby reducing the bulk of said circuit and also avoiding connection wires between the circuit and said first printed circuit board.

In addition, experience shows that in spite of the vibration due to the reciprocating motion of the moving magnetic element, the electronic control circuit presents good reliability and normal lifetime, such that the electromagnetic actuator of the invention operates at least as well as a prior art actuator.

In preferred embodiments of the actuator of the invention, use may also be made of one or more of the following dispositions:

the electromagnetic actuator includes a second electromagnet comprising a second electrical coil electrically connected to the electronic control circuit and associated with a second metal yoke, the first and second electromagnets having a common central axis and being separated by a space partially occupied by a ferro-magnetic slab extending perpendicularly to said central axis and constituting said moving magnetic element, said ferromagnetic slab being disposed between the first electrode and a second electrode which is electrically connected to the electronic control circuit and which is carried by a second printed circuit board that is electrically connected to the first printed circuit board and that is secured to the second electromagnet, said second electrode co-operating with said first electrode and the ferromagnetic slab to constitute said capacitive sensor, and the first and second printed circuit boards forming a support assembly carrying the electronic control circuit (in other words the electronic control circuit is either carried by the first board, or is shared between both boards);

the first and second yokes respectively comprise first and second metal cores which are respectively surrounded by the first and second coils, the ferro-magnetic slab and the first and second electrodes being axially disposed between said first and second metal cores, the first and second printed circuit boards having respective inside faces facing each other and carrying the first and second electrodes, the electronic control circuit being carried by at least one of said inside faces, said circuit being disposed radially outside said ferromagnetic slab and the first and second electrodes;

the first printed circuit board is stuck firstly to the first metal core and secondly to a first cheek plate which supports the first coil, while the second printed circuit board is stuck firstly to the second metal core and secondly to a second cheek plate which supports the second coil;

the first and second cheek plates extend radially outwards respectively beyond said first and second coils;

at least the first printed circuit board has a zone which is not disposed facing the second printed circuit board, said zone including at least one electronic component which extends from said first printed circuit board to beyond said second printed circuit board; and the electronic control circuit is connected to the ferromagnetic slab by a non-shielded flexible electric wire having a length of less than 3 cm: this provides savings and simplification compared with prior art actuators, where the length of the flexible wire is considerably longer because of the distance between the electronic control circuit and the moving magnetic element, thus making it necessary to use shielded coaxial wire.

The invention also provides a hydraulic anti-vibration support designed to be interposed between two rigid elements to damp and filter vibration between those two elements, the support comprising:

first and second rigid strength members respectively secured to the first and second rigid elements;

a thick elastomer wall interconnecting the first and second strength members, while defining a working chamber that is filled with liquid;

a flexible elastomer membrane carried by the first strength member and defining a compensation chamber also filled with liquid and in communication with said working chamber via a narrow passage;

a piston having at least one face in contact with the working chamber and mounted on the first strength member so as to be capable of moving axially; and an electromagnetic actuator as defined above, in which the moving magnetic element is connected to the piston to impart compensatory vibration to the piston suitable for attenuating the vibration between the first and second rigid elements.

In preferred embodiments of the antivibration support of the invention, use may optionally also be made of one or more of the following dispositions:

the first strength member has firstly an outside including first and second zones disposed side by side and defining part of the working chamber and the compensation chamber, and secondly an inside forming a box containing the electromagnetic actuator; and the first strength member is made of metal and has at least one heat dissipation zone in contact with at least the first printed circuit board to cool at least one electronic component carried by said printed circuit board.

BRIEF DESCRIPTION OF THE DRAWING

Other characteristics and advantages of the invention appear from the following description of an embodiment given by way of non-limiting example and with reference to the accompanying drawing.

In the drawing:

FIG. 1 is a vertical section view through a hydraulic antivibration support constituting an embodiment of the invention, and fitted with an electro-magnetic actuator;

FIG. 2 is a detail view of FIG. 1 on a larger scale; and

FIG. 3 is a view from beneath of the anti-vibration support of FIG. 1.

MORE DETAILED DESCRIPTION

In the various figures, the same references are used to designate elements that are identical or similar.

In the following description, terms such as "up", "down", "vertical", "horizontal", "top", "bottom" are used solely to clarify the description, and they are used with reference to the usual position of the hydraulic antivibration support 1, however these terms should not be considered as being limiting in any case.

The antivibration support comprises:

a rigid magnetic head 2 extended upwards by a bolt 3 on an axis X which is designed to be fixed, for example, to a portion of the power unit of a motor vehicle;

a rigid metal base 4 which is generally made of a plurality of parts and which comprises an annular bearing surface 5 centered on the axis X, the base 4 also forming a downwardly open rectangular box 6 having in one of its sides a cup 7 that is laterally open to the outside, with the base 4 being designed to be fixed, for example to the structure of a vehicle, in particular by means of fixing holes 8 (FIG. 3);

a thick frustoconical wall 9 of elastomer centered on the axis X and flaring downwards from a top secured to the head down to an annular base secured in sealed manner to the annular bearing surface 5, the wall 9 having sufficient compression strength to act as a support for the power unit fixed to the head 2, and said wall 9 co-operating with the base 4 to define a working chamber A which is leakproof and filled with liquid;

a flexible elastomer membrane 10 which is connected in sealed manner to the base 4, covering the cup 7 so as to co-operate with the cup to define a compensation chamber B that is leakproof and filled with liquid;

a narrow channel C formed in the base 4, said channel also being filled with liquid and putting the working chamber A into communication with the compensation chamber B;

a piston 11 whose top face 11a is in contact with an air chamber D defined by a plate 12 which is secured to the base 4 and which is connected to the piston 11 by an elastomer sealing ring 12a, said plate also being pierced by holes 12b which put the bottom face 11b of the piston into communication with the working chamber A, said piston being extended downwards by a sliding rod 11c which extends longitudinally along the axis X into the box 6 of the base 4, the rod 11c passing in sealed manner through the bottom wall of the working chamber A;

a preferably laminated ferromagnetic slab 13 extending radially from the rod 11c inside the box 6;

two electromagnets 14 and 15 (optionally replaced by a single electromagnet associated with a spring for returning the rod 11c) which are fixed inside the box 6, each comprising a respective electrical coil 16, 17 about the axis X mounted in a respective laminated ferro-magnetic yoke 18, 19, each yoke having a respective central core 20, 21 surrounded by the corresponding coil 16, 17 and separated from the ferromagnetic slab 13 by a narrow air gap 22, 23, the yokes 18, 19 preferably also having common external portions which are disposed outside the coils 16, 17 so as to create a magnetic circuit that is closed via the slab 13 and the air gaps 22 and 23;

cheek plates 24, 25, 26, and 27, particularly made of plastics material, which are disposed respectively above and below each of the coils 16, 17 to hold them together mechanically, the cheek plates 25 and 26 advantageously extending outwards beyond the coils 16 and 17 and occupying substantially all of the available transverse space inside the box 6; and an electronic control circuit 28 installed on the two facing faces of two printed circuit boards 29 and 30 stuck respectively to the facing axial faces of the cores 20 and 21 and to the facing faces of the cheek plates 25 and 26.

By way of example, the printed circuit boards 29 and 30 may be of the "FR4" type, being 200 µm to 500 µm thick, or they may be 100 µm thick polyimide boards.

In the case described herein, the electronic control circuit 28 is shared over the two printed circuit boards 29 and 30 which are interconnected by a wire 31 or some other electrical link, however the circuit 28 could optionally be located on only one of these boards assuming it has sufficient area.

In any event, the electronic circuit 28 is connected:

two both coils 16 and 17 so as to control the two electromagnets 14 and 15, thereby imparting vibratory motion to the piston 11;

to the ferromagnetic slab 13 via a flexible wire 32 which is generally not shielded and of a length lying in the range 1 cm to 3 cm, for example;

to two electrodes 33, only one of which can be seen in FIG. 2, these two electrodes 33 being constituted, for example, by layers of metal deposited on the respective surfaces of the printed circuit boards 29, 30 facing the ferromagnetic slab 13, the electrodes 33 co-operating with the ferromagnetic slab to constitute a capacitive displacement sensor enabling the electronic control circuit 28 at all times to determine the exact position of the slab 13 and thus of the piston 11; and at least one external connector 34 feeding electricity to the electronic control circuit 28 and optionally also serving to exchange information between the electronic control circuit 28 and an on-board computer of the vehicle.

In addition, at least one of the cheek plates 25, 26 and the comprising printed circuit boards 29, 30, in this case the cheek plate 26 and the board 30, can present one or more notches 35 to leave room for bulky electronic components 36 fixed to the other printed circuit board, in this case the board 29.

Finally, to facilitate cooling of one or more of the electronic components 37 of the circuit 28, e.g. power transistors, it is possible to make provision for the box 6 to have projections 38 situated in the vicinity of said components and on which the corresponding printed circuit board 29 is fixed, possibly together with the corresponding cheek plate 25, which fixing can be provided in particular by means of screws 39 (see FIG. 3). The metal box 6 thus serves to dissipate the heat produced by said components.

The above-described hydraulic antivibration support operates in conventional manner as follows:

when oscillations of relatively low frequency and large amplitude are applied between the head 2 and the base 4, the oscillations cause liquid to be driven back and forth between the chambers A and B via the narrow passage C, thereby causing said oscillations to be damped; and otherwise, in order to attenuate vibration of relatively high frequency and low amplitude between the head 2 and the base 4, the electromagnetic actuator constituted by the slab 13, the electromagnets 14, 15, and the electronic control circuit 28 imparts compensatory vibration to the piston 11, specifically as a function of the displacements of the slab 13 as measured by the above-mentioned capacitive sensor.

I claim:

1. An electromagnetic actuator comprising:
    at least a first electromagnet comprising a first electrical coil associated with a first metal yoke;
    a moving magnetic element movable under drive from the first electromagnet;
    at least a first electrode carried by a first printed circuit board secured to the first electromagnet, said first electrode being disposed facing the moving magnet to co-operate therewith to constitute a capacitive sensor detecting the displacement of said moving magnetic element;
    an electronic control circuit electrically connected firstly to the first electrode and to the moving magnetic element to measure the displacement of said moving magnetic element, and secondly to the first coil to control the first electromagnet to impart vibratory motion to the moving magnetic element as a function of the measured displacement of said moving magnetic element;
    wherein the electronic control circuit is carried at least in part by said first printed circuit board; and
    a second electromagnet comprising a second electrical coil electrically connected to the electronic control circuit and associated with a second metal yoke, the first and second electromagnets having a common central axis and being separated by a space partially occupied by a ferromagnetic slab extending perpendicularly to said central axis and constituting said moving magnetic element, said ferromagnetic slab being disposed between the first and a second electrode which is electrically connected to the electronic control circuit and which is carried by a second printed circuit board that is electrically connected to the first printed circuit board and that is secured to the second electromagnet, said second electrode co-operating with said first electrode and the ferromagnetic slab to constitute said capacitive sensor, and the first and second printed circuit boards forming a support assembly carrying the electronic control circuit;
    wherein the first and second yokes respectively comprise first and second metal cores which are respectively surrounded by the first and second coils, the ferromagnetic slab and the first and second electrodes being axially disposed between said first and second metal cores, the first and second printed circuit boards having respective inside faces facing each other and carrying the first and second electrodes, respectively, the electronic control circuit being carried by at least one of said inside faces, said circuit being disposed radially outside said ferromagnetic slab and the first and second electrodes.

2. An electromagnetic actuator according to claim 1, in which the first printed circuit board is struck firstly to the first metal core and secondly to a first cheek plate which supports the first coil, while the second printed circuit board is struck firstly to the second metal core and secondly to a second cheek plate which supports the second coil.

3. An electromagnetic actuator according to claim 2, in which the first and second cheek plates extend radially outwards respectively beyond said first and second coils.

4. An electromagnetic actuator comprising:
    at least a first electromagnet comprising a first electrical coil associated with a first metal yoke;
    a moving magnetic element movable under drive from the first electromagnet;
    at least a first electrode carried by a first printed circuit board secured to the first electromagnet, said first electrode being disposed facing the moving magnet to co-operate therewith to constitute a capacitive sensor detecting the displacement of said moving magnetic element;
    an electronic control circuit electrically connected firstly to the first electrode and to the moving magnetic element to measure the displacement of said moving magnetic element, and secondly to the first coil to control the first electromagnet to impart vibratory motion to the moving magnetic element as a function of the measured displacement of said moving magnetic element;
    wherein the electronic control circuit is carried at least in part by said first printed circuit board; and
    a second electromagnet comprising a second electrical coil electrically connected to the electronic control circuit and associated with a second metal yoke, the first and second electromagnets having a common central axis and being separated by a space partially occupied by a ferromagnetic slab extending perpendicularly to said central axis and constituting said moving magnetic element, said ferromagnetic slab being disposed between the first and a second electrode which is electrically connected to the electronic control circuit and which is carried by a second printed circuit board that is electrically connected to the first printed circuit board and that is secured to the second electromagnet, said second electrode co-operating with said first electrode and the ferromagnetic slab to constitute said capacitive sensor, and the first and second printed circuit boards forming a support assembly carrying the electronic control circuit;
    wherein at least the first printed circuit board has a zone which is not disposed facing the second printed circuit board, said zone including at least one electronic component which extends from said first printed circuit board to beyond said second printed circuit board.

5. An electromagnetic actuator comprising:

at least a first electromagnet comprising a first electrical coil associated with a first metal yoke;

a moving magnetic element movable under drive from the first electromagnet;

at least a first electrode carried by a first printed circuit board secured to the first electromagnet, said first electrode being disposed facing the moving magnet to co-operate therewith to constitute a capacitive sensor detecting the displacement of said moving magnetic element;

an electronic control circuit electrically connected firstly to the first electrode and to the moving magnetic element to measure the displacement of said moving magnetic element, and secondly to the first coil to control the first electromagnet to impart vibratory motion to the moving magnetic element as a function of the measured displacement of said moving magnetic element;

wherein the electronic control circuit is carried at least in part by said first printed circuit board;

wherein the electronic control circuit is connected to the ferromagnetic slab by a non-shielded flexible electric wire having a length of less than 3 cm.

6. A hydraulic antivibration support for interposing between two rigid elements to damp and filter vibration between said two elements, the support comprising:

first and second rigid strength members respectively secured to the first and second rigid elements;

a thick elastomer wall interconnecting the first and second strength members, while defining a working chamber that is filled with liquid;

a flexible elastomer membrane carried by the first strength member and defining a compensation chamber also filled with liquid and in communication with said working chamber via a narrow passage;

a piston having at least one face in contact with the working chamber and mounted on the first strength member so as to be capable of moving axially; and an electromagnetic actuator comprising:

at least a first electromagnet comprising a first electrical coil associated with a first metal yoke;

a moving magnetic element movable under drive from the first electromagnet;

at least a first electrode carried by a first printed circuit board secured to the first electromagnet, said first electrode being disposed facing the moving magnet to co-operate therewith to constitute a capacitive sensor detecting the displacement of said moving magnetic element;

an electronic control circuit electrically connected firstly to the first electrode and to the moving magnetic element to measure the displacement of said moving magnetic element, and secondly to the first coil to control the first electromagnet to impart vibratory motion of the moving magnetic element as a function of the measured displacement of said moving magnetic element;

wherein the electronic control circuit is carried at least in part by said first printed circuit board; and a second electromagnet comprising a second electrical coil electrically connected to the electronic control circuit and associated with a second metal yoke, the first and second electromagnets having a common central axis and being separated by a space partially occupied by a ferromagnetic slab extending perpendicularly to said central axis and constituting said moving magnetic element, said ferromagnetic slab being disposed between the first and a second electrode which is electrically connected to the electronic control circuit and which is carried by a second printed circuit board that is electrically connected to the first printed circuit board and that is secured to the second electromagnet, said second electrode co-operating with said first electrode and the ferromagnetic slab to constitute said capacitive sensor, and the first and second printed circuit boards forming a support assembly carrying the electronic control circuit;

wherein the first and second yokes respectively comprise first and second metal cores which are respectively surrounded by the first and second coils, the ferromagnetic slab and the first and second electrodes being axially disposed between said first and second metal cores, the first and second printed circuit boards having respective inside faces facing each other and carrying the first and second electrodes, the electronic control circuit being carried by at least one of said inside faces, said circuit being disposed radially outside said ferromagnetic slab and the first and second electrodes, and wherein the moving magnetic element is connected to the piston to impart compensatory vibration to the piston suitable for attenuating the vibration between the first and second rigid elements.

7. An antivibration support according to claim 6, in which the first strength member has firstly an outside including first and second zones disposed side by side and defining part of the working chamber and the compensation chamber, and secondly an inside forming a box containing the electromagnetic actuator.

8. An antivibration support according to claim 7, in which the first strength member is made of metal and has at least one heat dissipation zone in contact with at least the first printed circuit board to cool at least one electronic component carried by said printed circuit board.

* * * * *